(12) United States Patent
Casale et al.

(10) Patent No.: US 7,530,558 B2
(45) Date of Patent: *May 12, 2009

(54) CUTTING BOARD ASSEMBLY HAVING DRAWER WITH VARIABLE VOLUME CONTAINMENT SPACE

(75) Inventors: Joseph N. Casale, Cary, NC (US); Daniel Lee Bizzell, Davidson, NC (US); Jerry Shew, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/530,889

(22) Filed: Sep. 11, 2006

(65) Prior Publication Data

US 2007/0108685 A1 May 17, 2007

Related U.S. Application Data

(60) Provisional application No. 60/596,922, filed on Oct. 28, 2005.

(51) Int. Cl.
*B23Q 3/00* (2006.01)
*B23Q 1/00* (2006.01)
*B25B 1/00* (2006.01)

(52) U.S. Cl. .................. 269/289 R; 269/13; 269/15

(58) Field of Classification Search ............ 269/289 R, 269/13, 15, 302.1
See application file for complete search history.

(56) References Cited

U.S. PATENT DOCUMENTS

| | | | |
|---|---|---|---|
| D140,595 S | 3/1945 | Browne et al. | |
| 2,609,024 A | 9/1952 | Russ | |
| 2,796,902 A | 6/1957 | Mercury | |
| 3,079,028 A | 2/1963 | Rosner | |

(Continued)

FOREIGN PATENT DOCUMENTS

CA 2449313 5/2005

(Continued)

OTHER PUBLICATIONS

New Cutting Board With Grater, retrieved on Sep. 21, 2006, retrieved from the Internet :<URL: http://cgi.ebay.com/ws/eBayISAPI.dll?ViewItem&item=150025735...>.

(Continued)

*Primary Examiner*—Joseph J Hail, III
*Assistant Examiner*—Alvin J. Grant
(74) *Attorney, Agent, or Firm*—Tillman Wright, PLLC; Chad D. Tillman; Jeremy C. Doerre

(57) ABSTRACT

A cutting board assembly comprises a cutting board; a frame for supporting the cutting board thereon; and a drawer having a length, a width, and a depth defining a containment space for containing food therein, and having measuring increments marked along a length or a width thereof. The drawer is supported by the frame for sliding movement between a retracted position, in which the drawer is substantially retained within the frame and the containment space is substantially covered, and a protracted position, in which the containment space is substantially uncovered. A volume of food retained within the containment space may be measured using the increments marked along the length or the width of the drawer.

18 Claims, 8 Drawing Sheets

U.S. PATENT DOCUMENTS

| | | | | |
|---|---|---|---|---|
| 3,598,164 A | * | 8/1971 | August | 269/13 |
| 3,798,975 A | * | 3/1974 | Horst | 73/429 |
| 4,041,964 A | | 8/1977 | Shamoon | |
| D248,019 S | | 5/1978 | Scheid | |
| 4,243,184 A | | 1/1981 | Wright | |
| D259,166 S | | 5/1981 | Krusche | |
| 4,456,021 A | | 6/1984 | Leavens | |
| D282,043 S | | 1/1986 | Morin | |
| D283,777 S | | 5/1986 | Morin | |
| 4,653,737 A | | 3/1987 | Haskins et al. | |
| 4,840,361 A | | 6/1989 | Richter | |
| 5,363,755 A | | 11/1994 | Liang | |
| 5,366,208 A | | 11/1994 | Benjamin | |
| 5,382,009 A | * | 1/1995 | Mertz et al. | 269/16 |
| 5,386,978 A | | 2/1995 | Ladwig | |
| D357,847 S | | 5/1995 | Hoffman | |
| D372,176 S | | 7/1996 | Meisner | |
| D374,380 S | * | 10/1996 | Sawatsky | D7/698 |
| 5,626,067 A | | 5/1997 | Lothe | |
| 5,865,105 A | * | 2/1999 | Pepelanov | 99/446 |
| 5,904,271 A | * | 5/1999 | Collins et al. | 222/158 |
| 5,924,352 A | | 7/1999 | Lothe | |
| 5,938,185 A | | 8/1999 | Kletter | |
| 6,082,645 A | | 7/2000 | Himmighofen et al. | |
| 6,359,239 B1 | | 3/2002 | Missler et al. | |
| 6,371,470 B1 | | 4/2002 | Ward | |
| 6,478,293 B1 | * | 11/2002 | Keener | 269/289 R |
| 6,651,970 B2 | * | 11/2003 | Scott | 269/289 R |
| D500,645 S | | 1/2005 | Goggin | |
| D500,940 S | | 1/2005 | Goggin | |
| 6,837,068 B2 | * | 1/2005 | Wood | 62/442 |
| 6,915,657 B1 | * | 7/2005 | Wood | 62/371 |
| 6,941,766 B2 | | 9/2005 | Wood | |
| 7,258,289 B1 | | 8/2007 | Butt | |
| 2003/0052582 A1 | * | 3/2003 | Searer et al. | 312/348.3 |
| 2005/0040580 A1 | | 2/2005 | Davis | |
| 2005/0061021 A1 | * | 3/2005 | Uihlein et al. | 62/441 |
| 2005/0236947 A1 | * | 10/2005 | LeClear et al. | 312/404 |
| 2006/0208410 A1 | | 9/2006 | McRorie | |
| 2006/0273701 A1 | * | 12/2006 | Kelley et al. | 312/205 |

FOREIGN PATENT DOCUMENTS

| | | |
|---|---|---|
| GB | 1171740 | 11/1969 |
| JP | 10071094 | 3/1998 |
| KR | 20199500005366 | 6/1995 |
| KR | 1020010024656 | 4/2001 |

OTHER PUBLICATIONS

Tupperware Grater Slicer Shredder EUC Handy Item, retrieved on Sep. 21, 2006, retrieved from the Internet :<URL: http://cgi.ebay.com/ws/eBayISAPI.dll?ViewItem&item=44572740...>.

Information Disclosure Statement (IDS) Letter Regarding Common Patent Application(s), submitted by Applicant on Oct. 2, 2008.

* cited by examiner

US 7,530,558 B2

CUTTING BOARD ASSEMBLY HAVING DRAWER WITH VARIABLE VOLUME CONTAINMENT SPACE

I. CROSS-REFERENCE TO RELATED APPLICATIONS

The present application is a nonprovisional of, and claims priority under 35 U.S.C. §119(e) to Casale, U.S. Provisional Patent Application No. 60/596,922 filed Oct. 28, 2005. The entire disclosure of this patent application is hereby incorporated herein by reference.

II. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

III. BACKGROUND OF THE INVENTION

Cutting boards for use in cutting and preparing various food items are generally known. Further, cutting board assemblies including various components that aid in the cutting and preparation process are also known. Examples of available cutting board assemblies include those disclosed in U.S. Pat. No. 5,904,271 to Collins, et al. and U.S. Pat. No. 6,651,970 to Scott.

Collins et al. discloses a cutting board assembly including a cutting board surface having a pair of legs supporting the surface, a container for holding food that has been cut or prepared and a container for disposing of waste produced during the cutting. The containers are separate components that may be detachably connected to the cutting board surface when it is being used. However, there is no accommodation for storing the containers integrally with the cutting surface when it is not in use.

Collins et al. also discloses that the container for holding food that has been cut or prepared includes hash marks for measuring purposes. The hash marks begin near a base of the container and extend up a wall of the container such that food volume may be measured based on the depth of the food in the container. This method of measuring volume may be well suited for liquid or granular food items that have a tendency to level out in a container due to gravity. However, cut food items, which are typically more bulky, solid foods, such as onions, peppers, celery, and the like, do not share the tendency to level out along the base of a container. In contrast, such food items tend to stack in mounds. Accordingly, the "bottom-up" volume measuring method of Collins et al. is not ideal for the typical type of food items that are cut using a cutting board.

Scott discloses a cutting board assembly with multiple interchangeable cutting surfaces. The available surfaces include a perforated cutting surface, a cutting surface including a door hinged to the surface and a cold cutting surface. Both the perforated surface and the surface with the door provide access to a holding container under the cutting surface. For the perforated surface, the holding container provides a receptacle for juices or other fluids associated with the food being cut. For the surface with the hinged door, the holding container provides many uses. Examples include holding waste from the food being cut and holding the food that has been cut until it is used. The holding container slides into a base of the cutting board assembly and may be stored therein when the cutting board assembly is not in use. Unfortunately, in order to access the holding container, the hinged door of the surface must be lifted thereby reducing the surface area available for cutting.

A cutting board assembly addressing the shortcomings of available cutting board assemblies would be desirable. For instance, a cutting board assembly providing a cutting surface free from obstruction in addition to containers for holding cut food that may be stored within the cutting board assembly when it is not in use would be advantageous. Further, a cutting board assembly providing a means for measuring the volume of cut food that is better suited to bulky, solid foods would be advantageous.

IV. SUMMARY OF THE INVENTION

The present invention includes many aspects and features. In a first aspect, a cutting board assembly comprises a cutting board; a first container including a bottom, opposite side walls, and opposite end walls, the opposite side walls and opposite end walls extending from a periphery of the bottom to define a holding area wherein food items may be retained; and a frame including opposite side walls and a support platform from which the side walls extend. The cutting board is retained upon the support platform. The frame is configured to receive and retain therein the first container such that the first container is movable between a retracted position, in which the first container is substantially disposed interior to the frame and the holding area thereof is substantially covered, and a protracted position, in which the first container is substantially disposed exterior to the frame and the holding area of the container is at least partially uncovered.

In a feature of this aspect, the cutting board defines an uninterrupted, generally rectangular cutting surface. In another feature, the first container further comprises a detachable first partition disposed within the holding area so as to define two compartments for holding food items. In accordance with this feature, the first partition is movable such that the volume of the two compartments may be varied and food items retained therein may be measured. With regard to this feature, the first container further comprises a detachable second partition so as so as to define two compartments on either side thereof for holding food items. It is preferred that the second partition is movable such that the volume of the two compartments may be varied and food items retained therein may be measured.

In an additional feature, the first container is slidably supported by the frame such the first container may slide between the retracted position and the protracted position. In accordance with this feature, the frame includes support ledges to facilitate movement of the first container between the retracted position and the protracted position. In yet another feature, the first container is removable from the frame of the cutting board assembly.

In still yet another feature, the cutting board assembly further comprises a second container that is received and retained in the frame concurrently with the first container being received and retained within the frame. In accordance with this feature, the second container includes a holding area defined by a bottom of the second container, oppositely disposed side walls of the second container, and an end wall of the second container. Furthermore, a wall of the frame, which is disposed in fixed disposition relative to the frame, encloses the holding area of the second container. With regard to this feature, the second container is configured to move between a retracted position, wherein the bottom of the second container is substantially covered by the cutting board, and a protracted position, wherein the bottom of the second container is at least partially uncovered, the volume of the holding area of the second container varying as the second container is moved relative to the wall of the frame between the retracted and protracted positions. In furtherance of this feature, the frame further includes support ledges supporting the second container for sliding movement of the second container between the retracted position and the protracted position. With further regard to this feature, the second container is removable from the frame of the cutting board assembly. It is preferred that the second container include a collection trough for collecting liquids or fluids associated with cut food items placed therein.

In a further feature, the cutting board is made of wood. In another feature, the cutting board is made of polypropylene. In an additional feature, the cutting board is selectively removable from the support platform. In accordance with this feature, the cutting board is removably retained within the support platform. With regard to this feature, the cutting board may be removed and replaced with an alternative cutting board. With further regard to this feature, the side walls include indentations defining finger holds to facilitate removal of the cutting board from the support platform.

In yet another feature, the frame further comprises a peripheral top rim defining a top opening through which the cutting board is seated on the support platform.

In a second aspect of the invention, a cutting board assembly comprises a cutting board; a frame for supporting the cutting board thereon; and a drawer having a length, a width, and a depth defining a containment space for containing food therein, and having measuring increments marked along a length or a width thereof. The drawer is supported by the frame for sliding movement between a retracted position, in which the drawer is substantially retained within the frame and the containment space is substantially covered, and a protracted position, in which the containment space is substantially uncovered; wherein a volume of food retained within the containment space may be measured using the increments marked along the length or the width of the drawer.

In a feature of this aspect, the cutting board assembly further comprises a first partition configured to transect the containment space of the drawer. In another feature, the first partition defines two compartments of the drawer on either side thereof. With regard to this feature, the first partition is movable relative to the drawer, whereby a volume of one of the compartments of the drawer may be reduced in order to fill the volume of the compartment with food and thereby measure the food within the compartment.

In an additional feature, the first partition comprises a wall that is movable relative to the frame and is attached to the drawer for movement relative thereto. In yet another feature, the cutting board assembly further comprises a second partition configured to transect the volume of the drawer in order to define two compartments of the drawer on either side of the second partition. It is preferred that the second partition also is movable relative to the drawer. In still another feature, the first partition comprises a wall of the frame. The drawer is movable relative to the first partition when measuring a volume of food contained within the drawer. In accordance with this feature, the drawer comprises a scoop.

In a third aspect of the invention, a cutting board assembly comprises a cutting board; a frame including opposite side walls and a support platform supporting the cutting board thereon; and a drawer supported by the frame at a side wall thereof, the drawer having a bottom and opposite side walls and opposite end walls extending from a periphery of the bottom to define a containment space. A partition divides the containment space of the drawer to define two compartments of the drawer. The partition is movable relative to the drawer to vary the volume of each of the compartments of the drawer. The drawer is supported by the frame for sliding movement between a retracted position, in which the drawer is substantially retained within the frame and the containment space is substantially covered, and a protracted position, in which the containment space is substantially uncovered. In a feature of this aspect, the cutting board assembly further comprises measuring increments enabling measurement of a volume of food retained within at least one of the compartments of the container defined by the movable partition.

In a fourth aspect of the invention a cutting board assembly comprises a cutting board; a frame including opposite side walls and a support platform supporting the cutting board thereon; and a scoop supported by the frame at a side wall thereof, the scoop having a bottom, opposite side walls, and an end wall extending from a periphery of the bottom and defining a containment space that is open at one end of the scoop. The scoop is supported by the frame for sliding movement between a retracted position, in which the scoop is substantially retained within the frame and the containment space is substantially covered, and a protracted position, in which the containment space is substantially uncovered. The frame includes a partitioning wall extending downwardly from an end edge of the support platform, the partitioning wall being disposed in fixed disposition relative to the frame and extending within the containment space to define an end wall of the containment space of the scoop when the scoop is in the protracted position. In a feature of this aspect, the cutting board assembly further comprises a collection trough disposed in the bottom of the scoop for containing liquids or fluids associated with cut food items retained in the scoop.

In addition to the aforementioned aspects and features of the present invention, it should be noted that the present invention further includes the various possible combinations of such aspects and features.

V. BRIEF DESCRIPTION OF THE DRAWINGS

Further aspects, features, embodiments, and advantages of the present invention will become apparent from the following detailed description with reference to the drawings, wherein.

VI. DETAILED DESCRIPTION

Figure 1:
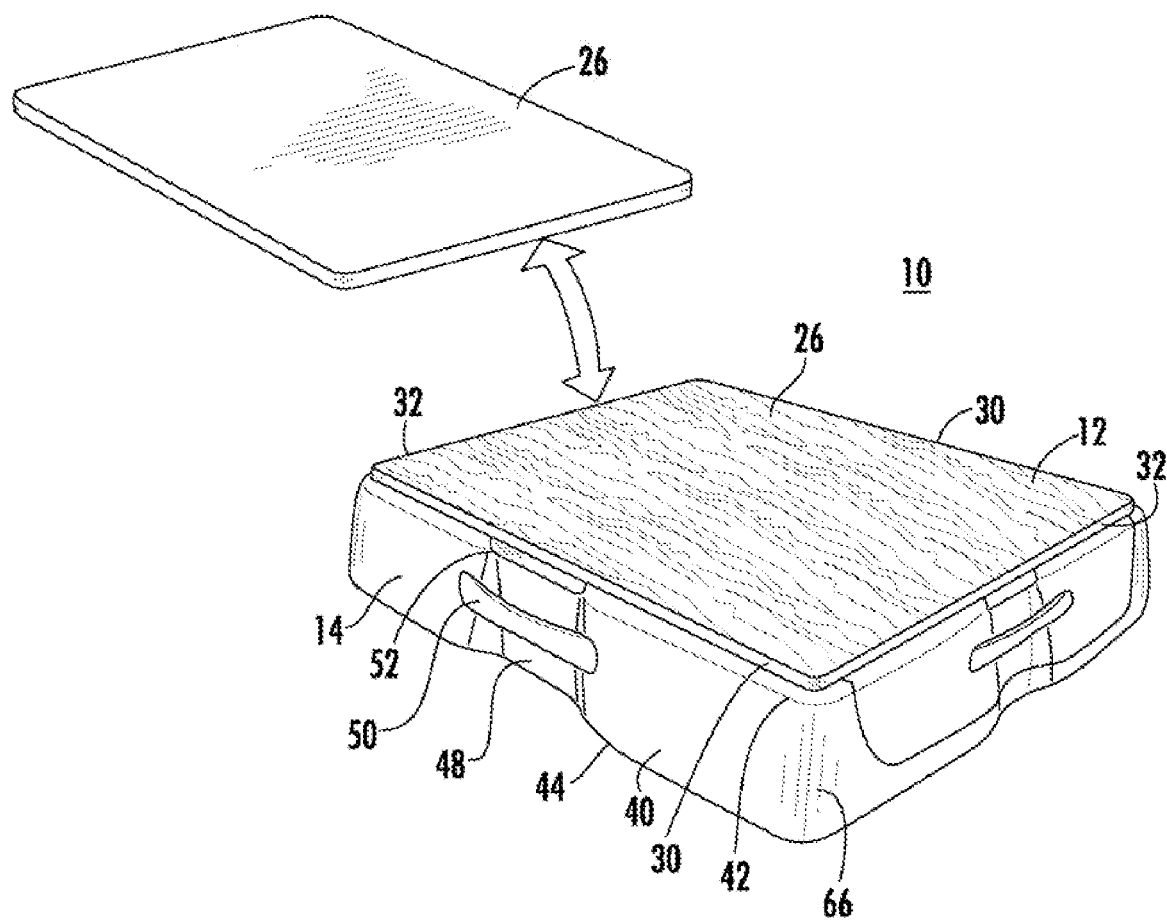
FIG. 1 is an end perspective view of a cutting board assembly in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its application, or uses.

Figure 2:
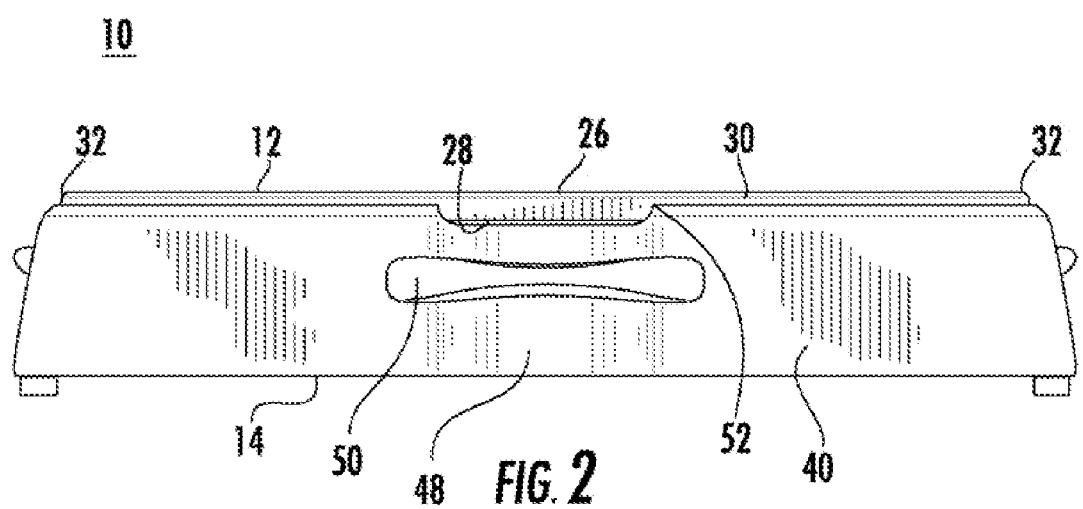
FIG. 2 is a side view of the cutting board assembly of FIG. 1.
Figure 3:
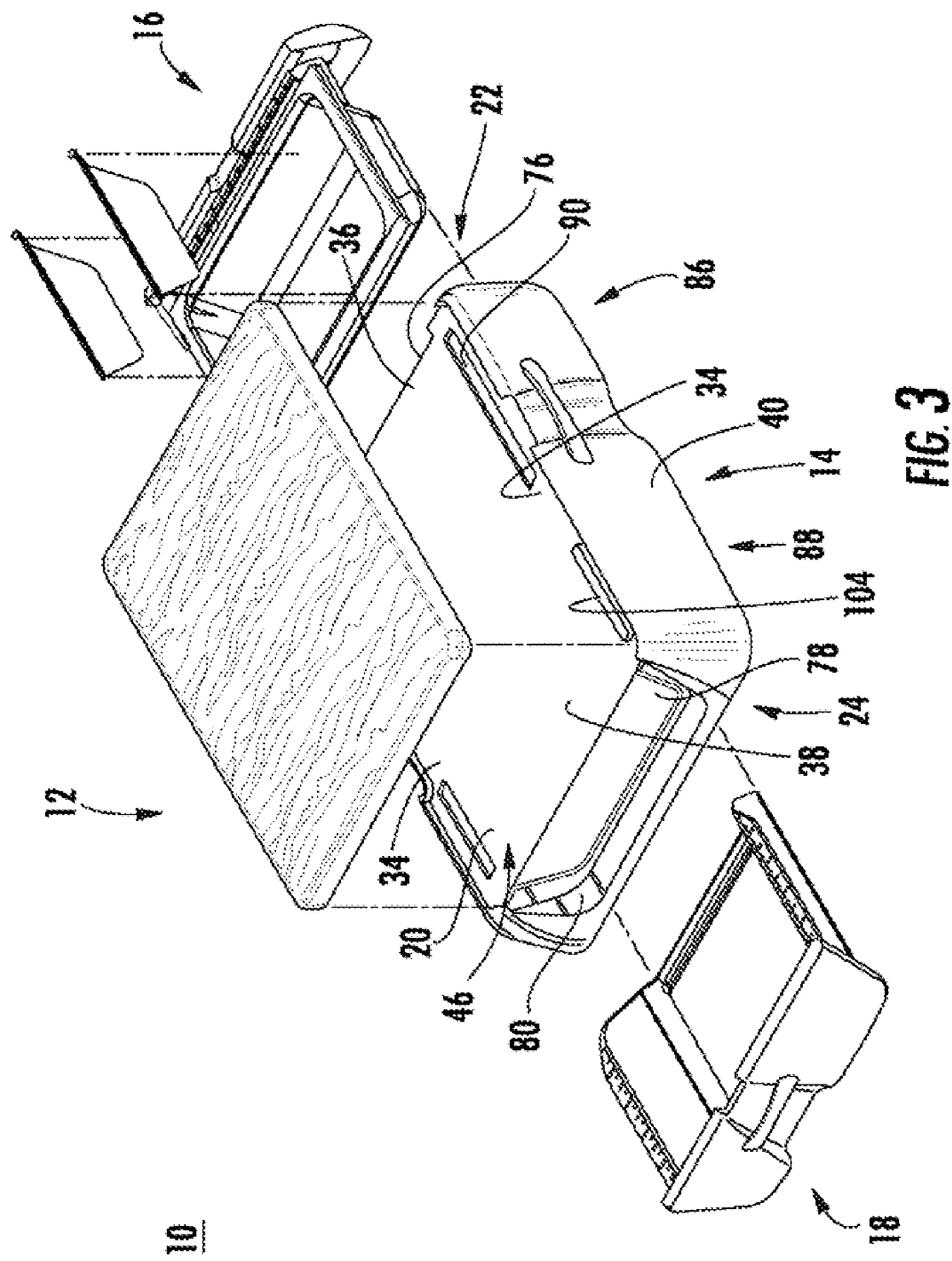
FIG. 3 is an exploded side perspective view of the cutting board assembly of FIG. 1.

FIG. 1 is an end perspective view of a cutting board assembly 10 in accordance with a preferred embodiment of the present invention. FIG. 2 is a side view of the cutting board assembly 10 of FIG. 1. FIG. 3 is an exploded side perspective view of the cutting board assembly 10 of FIG. 1.

The cutting board assembly 10 is a self-contained system that includes a cutting board 12, a frame 14, a first container 16, and a second container 18. The frame 14 is configured to support the cutting board 12 on a support platform 20 thereof. The frame 14 is further configured to support the first container 16 and second container 18 such that they may move between a retracted position, wherein the containers 16,18 are substantially disposed interior to the frame 14, and a protracted position, wherein the containers 16,18 are substantially disposed exterior to the frame 14. The first and second containers 16,18 retract and protract from opposite ends 22,24 of the frame 14, with the first container 16 corresponding with a first end 22 of the frame 14 and the second container 18 corresponding with a second end 24 of the frame 14.

In the present embodiment, the cutting board 12 is rectangular, having sides 30 disposed opposite one another and ends 32 disposed opposite one another. The cutting board 12 has a thickness defined between a top surface 26 and a bottom surface 28 thereof. Further, the cutting board 12 is generally planar with an obstruction-free top surface 26. When used, the cutting board 12 rests on the support platform 20 of the frame 14. Further, the cutting board 12 is easily removed from the cutting board assembly 10. A user simply lifts the cutting board 12 from the support platform 20 to remove it. This feature enables easy cleaning of the cutting board 12. For example, the cutting board 12 may be removed and washed in a sink or a dishwasher and then replaced on the frame 14. Further, it is contemplated that the cutting board assembly 10 will include multiple cutting boards 12, which are interchangeable with one another as illustrated in FIG. 1. For example, multiple cutting boards may have the same dimensions but may be constructed from different materials. Exemplary materials include wood and various plastics, such as polypropylene.

As shown in FIG. 3, the frame 14 includes the generally planar, rectangular support platform 20 having sides 34 disposed opposite one another and ends 36,38 disposed opposite one another and two side walls 40 disposed opposite one another in spaced relation with one another along opposite sides 34 of the platform 20. The support platform 20 is oriented generally orthogonal to the side walls 40 and is mounted to the side walls 40 near top edges 42 thereof. A first end 36 of the support platform 20 corresponds with the first end 22 of the frame 14, and similarly, a second end 38 of the support platform 20 corresponds with the second end 24 of the frame 14. The side walls 40 of the frame 14 generally define a width of the frame 14. The ends 22,24 of the frame 14 generally define a length of the frame 14, and the height of the side walls 40 generally defines the height of the frame 14.

As illustrated in FIG. 1, each side wall 40 has a bottom edge 44 disposed opposite to a top edge 42, with the bottom edge 44 resting on a surface on which the frame 14 is placed. The side walls 40 slope in a general inward direction relative to one another from the bottom edges 44 to the top edges 42 thereof such that the bottom edges 44 of the side walls 40 are disposed further apart from one another than the top edges 42.

As such, the width of the frame 14 narrows from the bottom edges 44 of the side walls 40 to the top edges 42 of the side walls 40.

The support platform 20 is recessed a small depth within the frame 14 thereby creating a recessed area 46 within which the cutting board 12 may fit. The depth of the recessed area 46 generally corresponds to the thickness of the cutting board 12 such that when the cutting board 12 is placed in the recessed area 46, the side walls 40 of the frame 14 enclose side edges of the cutting board 12. In at least one embodiment (not illustrated), the top edges 42 of the side walls 40 generally align with the top surface 26 of the cutting board 12. In at least one other embodiment, shown in FIG. 1, the bottom of the cutting board 12 is enclosed by the side walls 40 of the frame 14, but the top of the cutting board 12 extends above the top edges 42 of the side walls 40.

Each side wall 40 further includes an indentation 48 disposed centrally along a length of the side wall 40. A side handle 50 is attached to each side wall 40 in perpendicular covering relation to each indentation 48, leaving a recess behind the handle 50. The indentation 48 provides space for a person's hand to grasp the side handle 50. The side handles 50 provide convenient, easy means to pick up and carry the cutting board assembly 10. Additionally, each side wall 40 further includes a centrally disposed notched area 52 in the top edge 42 thereof. The notched area 52 is dimensioned to accommodate fingers of a person's hand such that the person may more easily grasp the cutting board 12 for removal from the frame 14 using the notched area 52.

Figure 4:
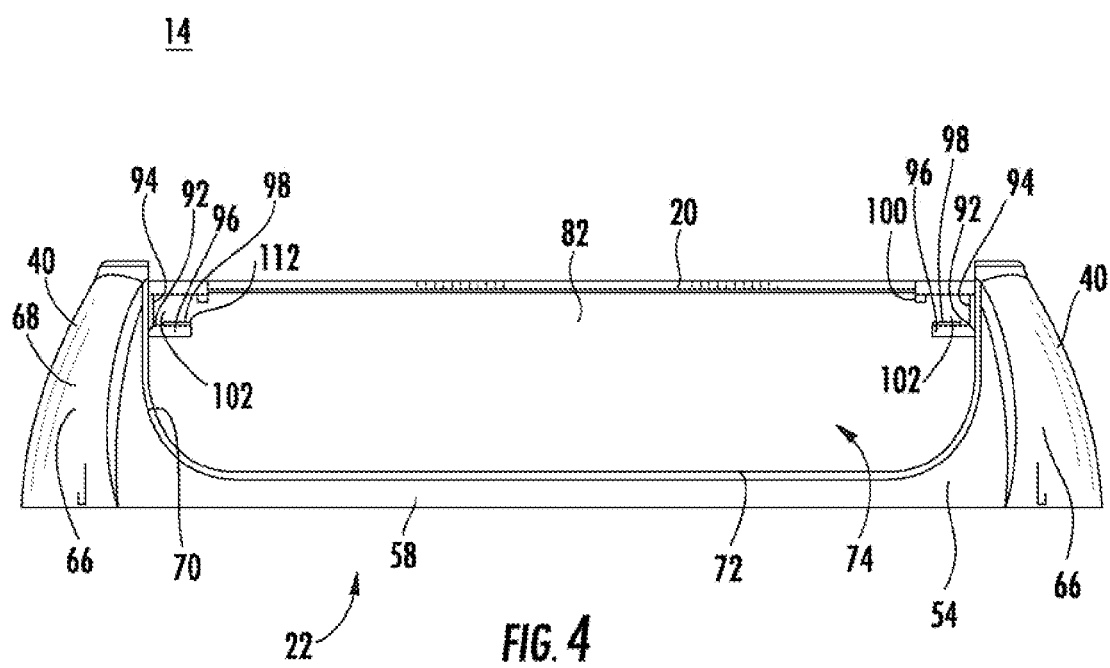
FIG. 4 is an end view of the first end of the frame of the cutting board assembly, shown with the first container removed.
Figure 5:
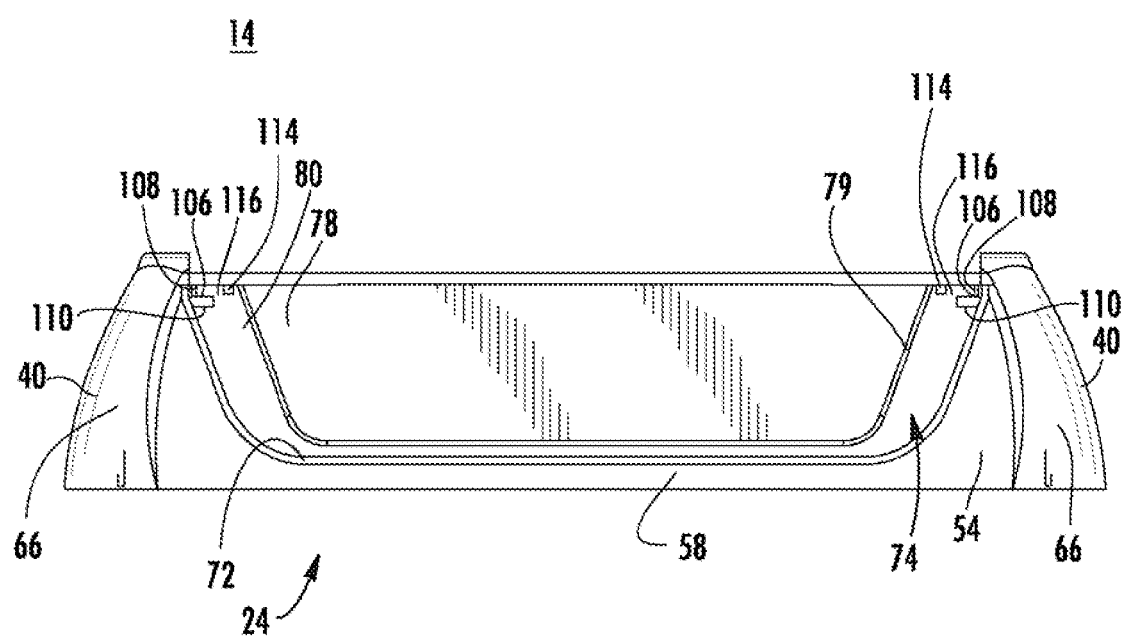
FIG. 5 is an end view of the second end of the frame of FIG. 4, shown with the second container removed.
Figure 6:
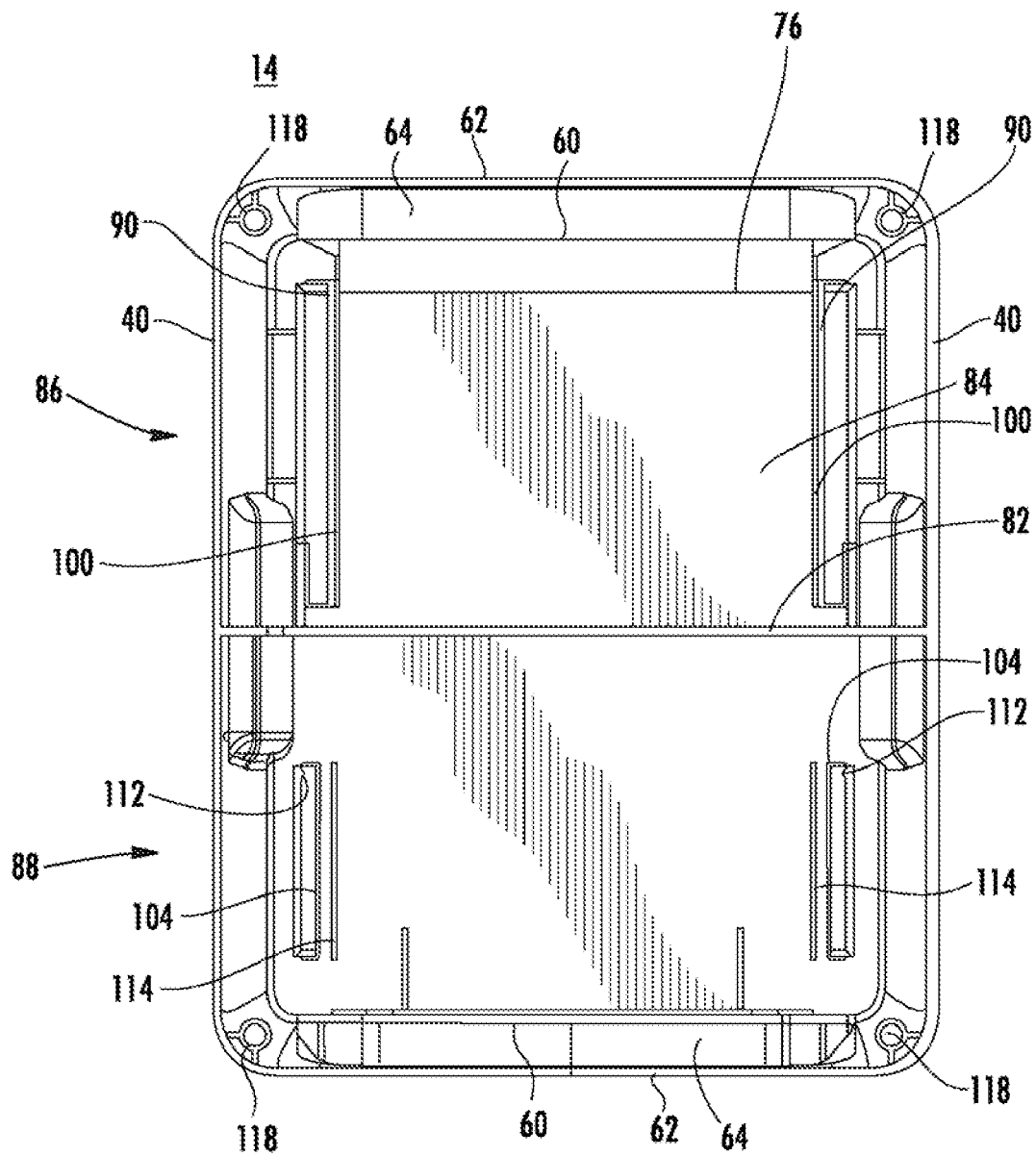
FIG. 6 is a bottom view of the frame of FIG. 4.

FIGS. 4-6 provide more detailed views of the frame 14. More particularly, FIG. 4 is an end view of the first end 22 of the frame 14, shown with the first container 16 removed. FIG. 5 is an end view of the second end 24 of the frame 14, shown with the second container 18 removed, and FIG. 6 is a bottom view of the frame 14. The first and second ends 22,24 of the frame 14 include end members 54 that are integrally connected to the side walls 40 and disposed generally orthogonally to the side walls 40. Each of the end members 54 comprises an elongate connection arm 58 having opposite ends and opposite sides, an interior side 60 and an exterior side 62. The end members 54 are connected to the side walls 40 such that the interior sides 60 of the connection arms 58 are nearly vertically aligned with the ends 36,38 of the support platform 20, with the interior sides 60 of the connection arms 58 being disposed slightly outside or exterior to the ends 36,38 of the support platform 20.

Bottom surfaces 64 of the connection arms 58 rest against or adjacent the surface on which the frame 14 is placed, such as a kitchen counter. The end members 54 transition into joint panels 66 that extend upwardly from the ends of each of the connection arms 58. The joint panels 66 are dimensioned to integrally connect the end members 54 to the side walls 40 with a smooth sloping, aesthetically pleasing transition. As shown, for example, in FIG. 4, the panels 66 have a respective exterior surface 68 that matches the slope of the side walls 40. They further have a respective interior surface 70 that connects with a top surface 72 of the connection arm 58 at each end 22,24 of the frame 14 to create an opening 74, having a generally "U"-shaped rim, at each end 22,24 of the frame 14.

As stated previously, the first end 22 and the second end 24 each have a respective end member 54 integrally connected to the side walls 40. However, each end has a unique feature that is not present in the opposite end. With each end 22,24, the unique feature aids in accommodating the container 16,18 associated with the particular end 22,24. For example, the first end 22 is configured to accommodate the first container 16. More specifically, a portion 76 of the first end 36 of the support platform 20 is cut away. The cut away portion 76 is dimensioned to accept a feature of the first container 16 therein when the first container 16 is in the retracted position.

Likewise, the second end 24 is configured to accommodate the second container 18. More specifically, a planar partition 78 extends downwardly from the second end 38 of the support platform 20 in orthogonal relation to the support platform 20. As shown in FIG. 5, the partition 78 extends downwardly into the opening 74 at the second end 24 of the frame 14 and terminates near the top surface 72 of the connection arm 58. A periphery 79 of the partition 78 mimics the shape of the rim of the opening 74. As such, a generally "U"-shaped slot or gap 80 is formed between the partition 78 and the rim of the opening 74 at the second end 24 of the frame 14. The slot or gap 80 is configured to receive the second container 18.

As shown in FIG. 6, a central dividing wall 82 extends downwardly from a bottom surface 84 of the support platform 20. The dividing wall 82 provides greater stability to the frame 14 and physically separates the first container 16 from the second container 18 when they are in the retracted position. The dividing wall 82 also separates the frame 14 into a first portion 86 and a second portion 88, as shown in FIG. 1.

Referring to FIGS. 4 and 6, the first portion 86 of the frame 14 has a first pair of slots 90 formed in the support platform 20 adjacent and aligned lengthwise with the side walls 40 of the frame 14. A support ledge 92 depends downwardly from an exterior side of each slot 90. Each support ledge 92 has a vertical component 94 and a horizontal component 96, with the vertical component 94 connecting the ledge 92 to the support platform 20 and the horizontal component 96 extending orthogonally from the vertical component 94. Each support ledge 92 includes a catch 98 disposed at an end of the horizontal component 96 near the central dividing wall 82. In addition, a rail 100 depends downwardly from an interior side of each slot 90. The support ledge 92 and the rail 100 of each slot 90 define a sliding space 102 in which the first container 16 may fit, thereby enabling the first container 16 to slide between the retracted position and the protracted position. The catches 98 of the support ledges 92 help retain the first container 16 in the retracted position thereby preventing the first container 16 from inadvertently moving from the retracted position to the protracted position.

Referring to FIGS. 5 and 6, the second portion 88 of the frame 14 similarly has a second pair of slots 104 formed in the support platform 20 adjacent and aligned lengthwise with the side walls 40 of the frame 14. A support ledge 106 depends downwardly from an exterior side of each slot of the second pair of slots 104. Each support ledge 106 has a vertical component 108 and a horizontal component 110, with the vertical component 108 connecting the ledge 106 to the support platform 20 and the horizontal component 110 extending orthogonally from the vertical component 108. Each support ledge 106 includes a catch 112 disposed at an end of the vertical component 108 near the central dividing wall 82. In addition, a rail 114 depends downwardly from an interior side of each slot of the second pair of slots 104. The support ledge 106 and the rail 114 of each slot define a sliding space 116 in which the second container 18 may fit, thereby enabling the second container 18 to slide between the retracted position and the protracted position. The catches 112 of the support ledges 106 help retain the second container 18 in the retracted position, thereby preventing the container 18 from inadvertently moving from the retracted position to the protracted position.

The frame 14 further includes feet 118 with rubber inserts disposed at each of four corners of the frame 14. Although the present embodiment includes rubberized feet, it is contemplated that the frame may include alternative features for preventing the frame from skidding or moving while the cutting board assembly is being used. For example, an alternative feature may include a rubber rim around the bottom of the frame. Moreover, many non-skid features are available for use with various contemplated embodiments of the cutting board assembly.

Figure 7:
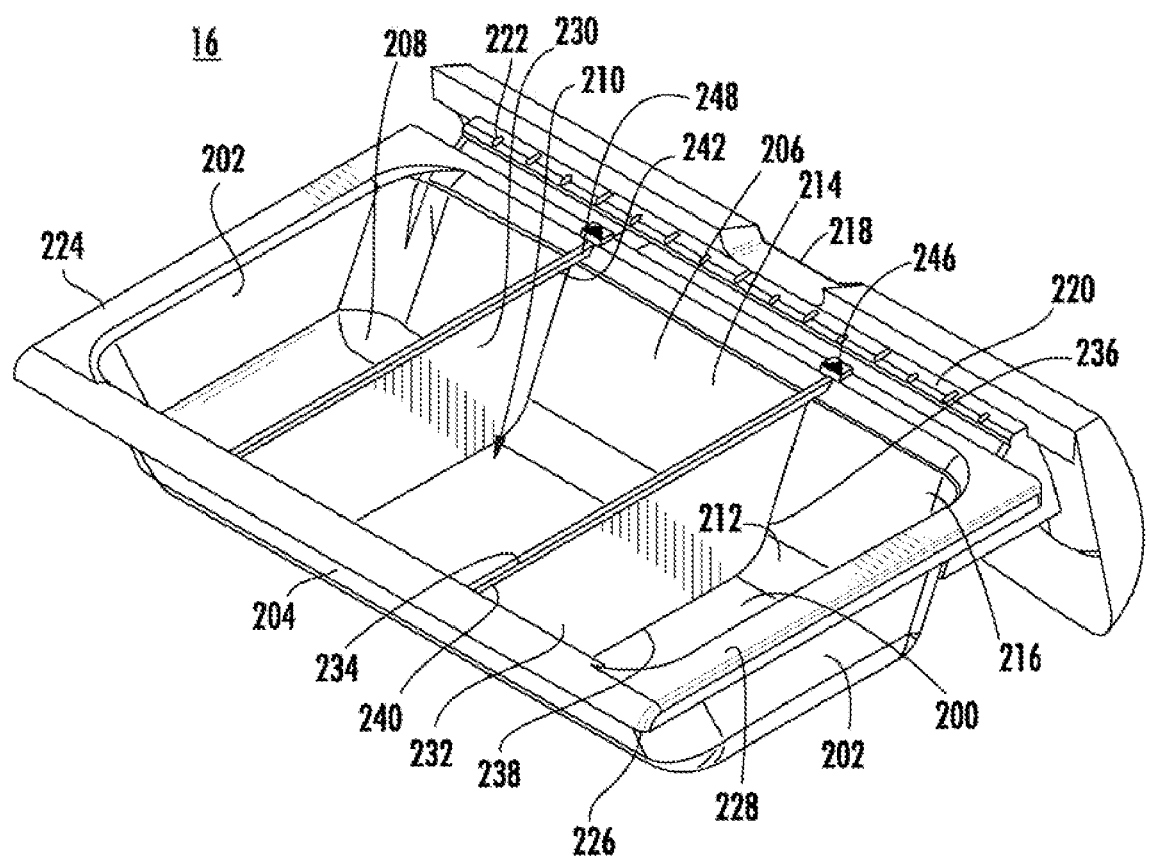
FIG. 7 is a perspective view of the first container.

FIG. 7 is a perspective view of the first container 16. The first container 16 has a bottom 200 and oppositely disposed side walls 202 and oppositely disposed end walls 204, 206 extending from a periphery 208 of the bottom 200 thereby defining a holding area 210 in which food items may be placed. The side walls 202 are shorter in length than the end walls 204,206 and define a width of the container 16, and the end walls 204,206 define a length of the container 16. The walls 202,204,206 of the container 16 have lower edges 212, which are connected to the bottom 200 of the container 16, and upper edges 214, which form a periphery 216 about a top of the container 16. Because the container 16 is to be retracted and protracted from the first end 22 of the frame 14, the container 16 is oriented such that the side walls 202 of the container 16 are adjacent the side walls 40 of the frame 14 when the container 16 is in the retracted position. In this orientation, the container 16 has an exterior end wall 206 and an interior end wall 204. The exterior end wall 206 has a gripping element 218 extending there from. The gripping element 218 aids in moving the container 16 between the retracted and protracted positions. In this embodiment, the gripping element 218 comprises a handle.

The exterior end wall 206 also has a measuring element 220 connected to it. The measuring element 220 is aligned widthwise with the exterior end wall 206 and has measurement increments 222 marked thereon. In the present embodiment, the measurement increments 222 are indented hash marks made in quarter cup increments with numerical indicators provided at the hash marks designating whole cup increments. Although the measuring element 220 is separate from the exterior end wall 206 in this embodiment, it is contemplated that the measuring element 220 may be incorporated into the exterior end wall 206. When the first container 16 is in the retracted position, the measuring element 220 fits into the cutaway portion 76 at the first end 36 of the support platform 20 such that the exterior end wall 206 of container 16 is flush with the end member 54 at the first end 22 of the frame 14.

A ledge 224 having a lip 226 at a rim thereof extends around the top periphery 216 of the container 16. Portions 228 of the ledge 224 that correspond with the side walls 202 of the container 16 are configured to be slidably supported by the support ledges 92 and rails 100 of the first slots 90 of the frame 14. More specifically, each side wall ledge portion 228 slides into the sliding space 102 between the support ledge 92 and rail 100 of the appropriate slot 90 thereby enabling the first container 16 to slide between a retracted position and a protracted position. The lip 226 at the rim of the container ledge 224 hooks onto the catch 98 of the support ledge 92 when the container 16 is in the retracted position, thereby preventing the container 16 from inadvertently sliding to the protracted position. However, when a user pulls the handle or other gripping element 218 of the container 16, the lip 226 is pulled over the catch 98 and the container 16 may be moved to the protracted position.

When the container 16 is in the retracted position, the holding area 210 is completely covered by the support platform 20 of the frame 14 and the exterior end wall 206 is flush with the exterior surface 62 of the end member 54 at the first end 22 of the frame 14. The exterior side wall 206 and the handle 218 attached thereto are accessible when the first container 16 is in the retracted position. When the container 16 is in the protracted position, the entire holding area 210 is accessible. The container 16 remains connected to the frame 14 when it is in the protracted position, with the ledge 224 of the interior end wall 204 connected to the frame 14 at this point. It should be noted that the container 16 may be detached from the frame 14 as desirable. Such detachability allows the container 16 to be easily cleaned or moved to a different location if the circumstances dictate it. The container 16 may be easily reconnected to the frame 14 by sliding the ledge side wall portions 228 into the sliding space 102 of the appropriate first slots 90.

The container 16 further includes a first partition 230 and a second partition 232, with each having upper 234, side 236 and lower 238 peripheral edges. The partitions 230,232 are configured so that they may fit within the container 16 when it is in both the retracted and protracted positions. The partitions 230,232 are identical, so only one will be described herein. The partition is configured to transect the holding area 210 of the container 16 lengthwise thereby enabling a volume of the holding area 210 to be varied with movement of the partition. The lower 238 and side 236 peripheral edges are dimensioned to fit adjacent an interior surface of the holding area 210 when the partition is placed in the holding area 210. When the partition is in the container 16, the upper edge 234 is aligned with the top 216 of the container 16. The upper edge 234 meets the side edges 236 at upper corners of the partition, comprising an interior upper corner 240 and an exterior upper corner 242.

The exterior upper corner 242 of the partition has a measurement indicator 246 provided thereon. In the present embodiment, the measurement indicator 246 is an arrow. Because the partition may be moved axially along the width of the container, the measurement indicator 246 of the partition may be aligned with the hash marks 222 of the measurement element 220 to enable a user to determine a volume of food items placed in the container 16. It will be obvious that in order to accurately measure the volume of food, the partition should be slid toward the appropriate side wall of the container 16 until the food items in the container 16 completely fill the volume enclosed by the partition in the holding area 210. It will also be obvious that because there are two partitions, up to three holding areas or "compartments" may be defined in the first container 16 by the partitions 230,232, i.e., a first compartment being defined by a first side wall 202 and the first partition 230; a second, central compartment being defined by the first and second partitions 230,232, and a third compartment being defined by the second partition 232 and a second side wall 202. The volume of food items placed in the multiple compartments may be determined in a similar fashion as described above. Simple subtraction may be needed to determine the volume in the central compartment if one of the partitions 230,232 is not aligned with a whole cup marking increment.

The measurement indicator 246 is located on an extension piece 248 that extends from the exterior upper corner 242 of the partition. The extension piece 248 is supported on the ledge 224 of the exterior side wall 206 of the container 16. As such, the extension piece 248 provides further stabilization for the partition when it is placed in the container 16. It is contemplated that the extension piece 248 may have a lip depending downwardly there from that would fit under the lip of the ledge 224. It is further contemplated that the partition may include a hooking element that fits over and is supported by the ledge 224 of the interior end wall 204 of the container 16 such that the partition may slide axially along the ledge 224 from one side wall 202 of the container 16 to the other.

Figure 8:
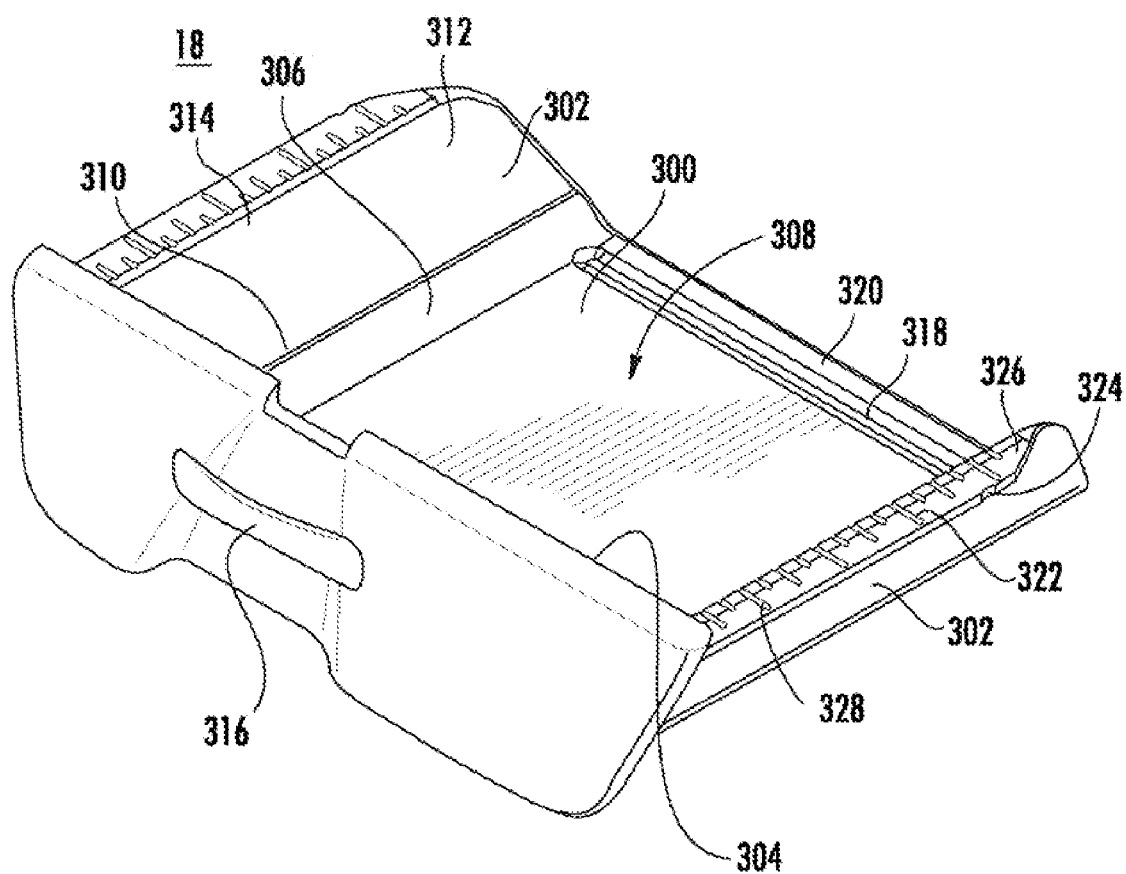
FIG. 8 is a perspective view of the second container.

FIG. 8 is a perspective view of the second container 18. The second container 18 has a bottom 300 and oppositely disposed side walls 302 and an exterior end wall 304 extending from a periphery 306 of the bottom 300 to define a holding area 308 of the second container 18 in which food items may be placed. An interior end 320 of the second container 18 is not enclosed; therefore, the second container 18 is in the form of a scoop. The side walls 302 define a width of the container 18, and the exterior end wall 304, along with the partition 78 of the frame 14, define a length of the container 18. The relationship of the frame partition 78 with the second container 18 will be described in greater detail herein below.

The walls 302,304 of the container 18 have lower edges 310, which are connected to the bottom 300 of the container 18, and upper edges 312, which form a partial periphery about a top 314 of the container 18. Because the container 18 is retracted and protracted from the second end 24 of the frame 14, the container 18 is oriented such that the side walls 302 of the container 18 are adjacent the side walls 40 of the frame 14 when the container 18 is in the retracted position.

Similarly to the first container 16, the exterior end wall 304 of the second container 18 has a gripping element 316 extending there from. The gripping element 316 aids in moving the container 18 between the retracted and protracted positions. In this embodiment, the gripping element 316 is a handle. In addition, the second container 18 has a groove 318 formed in the bottom 300 thereof near the interior end 320 of the container 18. The groove 318 extends widthwise along the bottom 300 of the container 18 and is intended to capture any liquids or fluids associated with food items placed in the second container 18.

A ledge 322 extends orthogonally from the upper edge 312 of each side wall 302 of the container. A notched recess 324 is formed near an interior end 326 of each ledge 322. The ledges 322 are configured to be slidably supported by the support ledges 106 and rails 114 of the second slots 104 of the frame 14. More specifically, each side wall ledge 322 slides into the sliding space 116 between the support ledge 106 and rail 114 of the appropriate slot 104 thereby enabling the second container 18 to slide between a retracted position and a protracted position. The notched recess 324 of each ledge 322 hooks on the catch 112 of the support ledge 106 when the container 18 is in the retracted position thereby preventing the container 18 from inadvertently sliding to the protracted position. However, when a user pulls the handle or other gripping element 316 of the container 18, the notched recess 324 is pulled past the catch 112 and the container 18 may be moved to the protracted position.

When the second container 18 is in the retracted position, the holding area 308 is covered by the support platform 20 of the frame 14. Further, most of the second container 18 is disposed interior to the frame 14, with only the exterior end wall 304 and handle 316 being accessible. When the second container 18 is in the protracted position, the holding area 308 is accessible. Further, in the protracted position, most of the second container 18 is disposed exterior to the frame 14. The second container 18 remains connected to the frame 14 in the protracted position, with some portion of the side wall ledges 322 being slidably fitted in the sliding spaces 116 between the support ledges 106 and rails 114 of the second slots 104 of the frame 14. Similarly to the first container 16, the second container 18 may be detached from the frame 14 if desired. It may be easily reconnected to the frame 14 by sliding the side wall ledges 322 back into the sliding spaces 116 of the second slots 104.

The side wall ledges 322 have measurement increments 328 marked thereon. In the present embodiment, the measurement increments 328 are indented hash marks made in quarter cup increments with numerical indicators provided at the hash marks designating whole cup increments. The measurement increments 328 allow a user to determine the volume of food items placed in the second container 18.

As mentioned previously, the frame partition 78 at the second end 24 of the frame 14 has a relationship with the second container 18. When the second container 18 is connected to the frame 18, the side walls 302 and bottom 300 thereof fit within the u-shaped slot 80 at the second end 24 of the frame 14. As such, the frame partition 78 provides an enclosing interior end wall for the second container 18 when it is connected to the frame 14. Therefore, for the second container 18, the retracted and protracted positions designate the minimum and maximum volume that the holding area 308 may contain. The volume of the holding area 308 of the second container 18 is made variable by the frame partition 78 when the second container 18 is slid inwardly and outwardly relative to the frame 14. Further, the volume of food items placed in the container 18 may be measured using the measuring increments 328 marked on the side ledges 322 of the container 18. The measurement should be read at the point where the frame partition 78 transects the measuring increment 328. It will be obvious that in order to accurately measure the volume of food, the container 18 should be slid inwardly toward the frame 14 until the food items in the container 18 completely fill the volume of the holding area 308, i.e., the food items should cover the bottom 300 of the container 18 and fill the volume such that they reach the top of the container. It is at this point that the measurement increment 328 at the intersection of the frame partition 78 should be read.

In use, the cutting board assembly 10 may be used with the containers 16,18 in their retracted or protracted positions. For illustrative purposes, use of the cutting board assembly 10 will be described with the first and second containers 16,18 in the protracted position. A person using the cutting board assembly 10 places a food item to be cut on the cutting board 12 and begins cutting it with an available cutting instrument such as a knife. As food items are cut, the user may slide cut food items into either the first 16 or the second container 18. This action clears off the cutting board 12 so that its top surface 26 is unobstructed for further cutting. The cut food items are conveniently held in one of the containers 16,18 until they are needed.

In one exemplary scenario, assume that the cut food items have been slid from the cutting board surface 26 to the second container 18. The second container 18 may be slid inwardly or outwardly from its protracted position until the cut food items fill the volume of the holding area 308. The volume of cut food items may then be determined by reading the measurement increment 328 at the point where the frame partition 78 transects the measurement increment 328 on one of the side wall ledges 322.

In another exemplary scenario, assume that the cut food items have been slid from the cutting board surface 26 to the first container 16. More specifically, the cut food items have been moved to a first holding area of the first container 16. Then a different food item is cut into pieces and this second cut food item is slid from the cutting board surface 26 to a second holding area of the first container 16. The first cut food item is separated from the second cut food item in the first container 16 by the first partition 230. The volumes of each cut food item may be determined using the measurement increments 222 of the measuring element 220 and the measurement indicators 246 of the partitions 230,232.

With the cutting board assembly 10, up to four different kinds of food items may be cut and stored separately in the first and second containers 16,18. In addition, the volume of each of these four cut food items may be measured while they are stored in the containers 16,18.

Often, a food item is cut so that it may be used as an ingredient in a recipe. The food item may need to be added to other ingredients in a mixing bowl or in a pot, pan or other cooking container. In this situation, the cutting board assembly 10 may be used to cut the food item, measure the food item, and transport the food item to the mixing bowl or cooking container where it is needed. The cut food item may be transported by moving the entire cutting board assembly 10 to the mixing container or cooking container, or more conveniently, may be transported by removing the container 16,18 in which the cut food item is held and pouring or dumping the cut food item from the cutting board assembly container 16,18 into the mixing container or cooking container.

In addition, the first container 16 may serve as a storage compartment for food items that have been cut. The first container 16 may store food items therein in its retracted positions and, alternatively, the first container 16 may serve as a storage compartment itself, separate from the frame 14, especially when covered with a lid or flexible sheet of material. Further, it is contemplated that the first container 16 may be used for storage of tools such as knives, peelers, and the like when the cutting board assembly 10 is not being used and the first container 16 is retained in the retracted position within the frame 14 of the cutting board assembly 10.

In a contemplated feature of one or more preferred embodiments, the containers 16,18 may be held in the protracted position with flex tabs. With this feature, the containers 16,18 may be removed from the frame 14 by pressing down the flex tabs and detaching the containers 16,18.

The cutting board assembly 10 avoids messy transitions that may occur in moving cut food from the cutting board 12 to a measuring container and then again to a cooking or mixing container. The cutting board assembly 10 represents a self-contained system that provides a cutting board 12 free from obstruction; provides a container 16 for holding cut foods that may be stored within the cutting board assembly 10; and provides a means for measuring the volume of cut food that is well suited to bulky, solid food items.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A cutting board assembly, comprising:
   (a) a cutting board;
   (b) a frame for supporting the cutting board thereon; and
   (c) a drawer having a length, a width, and a depth defining a containment space for containing food therein, and having measuring increments marked along a length or a width thereof;
   (d) wherein the drawer is supported by the frame for sliding movement, in a lengthwise direction of the drawer, between a retracted position, in which the drawer is substantially retained within the frame and the containment space is inaccessible for removing contents therefrom, and a protracted position, in which the containment space is accessible for removing contents therefrom;
   (e) wherein a first partition transects the containment space of the drawer and defines a first compartment of the drawer on a first side thereof; and
   (f) wherein the first partition is configured to slide, relative to the drawer, while transecting the containment space such that a volume of the first compartment of the drawer is reduced, whereby a volume of food retained within the first compartment may be measured using the measuring increments.

2. The cutting board assembly of claim 1, wherein the first partition defines a second compartment of the drawer on a second side thereof.

3. The cutting board assembly of claim 1, further comprising a second partition configured to transect the containment space of the drawer on a second side of the first partition, the second partition defining two additional compartments of the drawer, with one on each side of the second partition.

4. The cutting board assembly of claim 3, wherein the second partition is configured to slide relative to the drawer while transecting the containment space.

5. The cutting board assembly of claim 1, wherein the first partition comprises a wall of the frame, and wherein the drawer is movable relative to the first partition when measuring a volume of food contained within the drawer.

6. The cutting board assembly of claim 5, wherein the drawer comprises an open ended scoop.

7. The cutting board assembly of claim 1, wherein the frame comprises a support platform on which the cutting board is supported and a peripheral top rim that extends around and surrounds the top of the cutting board assembly and defines a top opening through which the cutting board is seated on the support platform.

8. The cutting board assembly of claim 1, wherein the drawer is detachable from the frame.

9. A cutting board assembly, comprising:
   (a) a cutting board;
   (b) a frame for supporting the cutting board thereon; and
   (c) a drawer supported by the frame, the drawer having bottom and opposite side walls and opposite end walls extending from a periphery of the bottom to define a containment space;
   (d) wherein a partition divides the containment space of the drawer to define two compartments of the drawer, the partition being configured to slide relative to the drawer in a widthwise direction of the drawer, while dividing the containment space such that a volume of one of the compartments of the drawer is reduced;
   (e) wherein the drawer is configured for sliding movement, in a lengthwise direction of the drawer, between retracted position, in which the drawer is substantially retained within the frame and the containment space is inaccessible for removing contents therefrom, and a protracted position, in which the containment space is accessible for removing contents therefrom; and (f) wherein the frame further comprises a peripheral top rim extending around and surrounding a top of the cutting board assembly and defining a top opening through which the cutting board is seated on the support platform.

10. A cutting board assembly, comprising:

(a) a cutting board;

(b) a frame for supporting the cutting board thereon; and (c) a scoop supported by the frame, the scoop having a bottom, opposite side walls, and an end wall extending from a periphery of the bottom and defining a containment space that is open at one end of the scoop;

(d) wherein the scoop is configured for sliding movement, in a lengthwise direction of the scoop, between a retracted position, in which the scoop is substantially retained within the frame and the containment space is inaccessible for removing contents therefrom, and a protracted position, in which the containment space is accessible for removing contents therefrom; and (e) wherein a partitioning wall extends downwardly from the frame, the partitioning wall being disposed in fixed disposition relative to the frame and extending within the containment space to define, on one side thereof, a compartment of the scoop such that a volume of the compartment is reduced as the scoop is moved from the protracted position toward the retracted position.

11. The cutting board assembly of claim 10, further comprising a collection trough disposed in the bottom of the scoop for containing liquids or fluids associated with cut food items retained in the scoop.

12. The cutting board assembly of claim 10, wherein the frame further comprises a peripheral top rim extending around and surrounding a top of the cutting board assembly and defining a top opening through which the cutting board is seated on the support platform.

13. The cutting board assembly of claim 10, wherein the scoop comprises measuring increments that enable measurement of a volume of food retained within the scoop.

14. The cutting board assembly of claim 13, wherein the measuring increments are located along a length of the scoop.

15. The cutting board assembly of claim 10, wherein the scoop is detachable from the frame.

16. A cutting board assembly, comprising:

(a) a cutting board;

(b) a frame for supporting the cutting board thereon; and (c) a drawer supported by the frame, the drawer having bottom and opposite side walls and opposite end walls extending from a periphery of the bottom to define a containment space;

(d) wherein a partition divides the containment space of the drawer to define two compartments of the drawer, the partition being configured to slide relative to the drawer in a widthwise direction of the drawer, while dividing the containment space such that a volume of one of the compartments of the drawer is reduced;

(e) wherein the drawer is configured for sliding movement, in a lengthwise direction of the drawer, between retracted position, in which the drawer is substantially retained within the frame and the containment space is inaccessible for removing contents therefrom, and a protracted position, in which the containment space is accessible for removing contents therefrom; and (f) wherein the drawer is detachable from the frame.

17. A cutting board assembly, comprising:

(a) a cutting board;

(b) a frame for supporting the cutting board thereon; and (c) a drawer supported by the frame, the drawer having bottom and opposite side walls and opposite end walls extending from a periphery of the bottom to define a containment space;

(d) wherein a partition divides the containment space of the drawer to define two compartments of the drawer, the partition being configured to slide relative to the drawer in a widthwise direction of the drawer, while dividing the containment space such that a volume of one of the compartments of the drawer is reduced;

(e) wherein the drawer is configured for sliding movement, in a lengthwise direction of the drawer, between retracted position, in which the drawer is substantially retained within the frame and the containment space is inaccessible for removing contents therefrom, and a protracted position, in which the containment space is accessible for removing contents therefrom; and (f) further comprising a second partition configured to divide the containment space of the drawer and configured to slide, relative to the drawer in the widthwise direction of the drawer, while the second partition divides the containment space.

18. A cutting board assembly, comprising:

(a) a cutting board;

(b) a frame for supporting the cutting board thereon; and (c) a drawer supported by the frame, the drawer having bottom and opposite side walls and opposite end walls extending from a periphery of the bottom to define a containment space;

(d) wherein a partition divides the containment space of the drawer to define two compartments of the drawer, the partition being configured to slide relative to the drawer in a widthwise direction of the drawer, while dividing the containment space such that a volume of one of the compartments of the drawer is reduced;

(e) wherein the drawer is configured for sliding movement, in a lengthwise direction of the drawer, between retracted position, in which the drawer is substantially retained within the frame and the containment space is inaccessible for removing contents therefrom, and a protracted position, in which the containment space is accessible for removing contents therefrom;

(f) wherein the drawer includes measuring increments enabling measurement of a volume of food retained within at least one of the compartments of the drawer defined by the movable portion; and (g) wherein the measuring increments are located along a width of the drawer.

* * * * *